(12) United States Patent
Lomas et al.

(10) Patent No.: US 6,788,479 B2
(45) Date of Patent: Sep. 7, 2004

(54) TUNEABLE OPTICAL FILTER

(75) Inventors: Martin Lomas, Nottingham (GB); Peter J Livermore, Nottingham (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 10/433,590

(22) PCT Filed: Dec. 5, 2001

(86) PCT No.: PCT/GB01/05422

§ 371 (c)(1),
(2), (4) Date: Nov. 10, 2003

(87) PCT Pub. No.: WO02/46823

PCT Pub. Date: Jun. 13, 2002

(65) Prior Publication Data

US 2004/0066570 A1 Apr. 8, 2004

(30) Foreign Application Priority Data

Dec. 6, 2000 (GB) .............................................. 0029663

(51) Int. Cl.7 ................................................. G02B 5/22
(52) U.S. Cl. ........................ 359/889; 359/885; 385/24; 398/85
(58) Field of Search ................................ 359/889, 885, 359/887, 888, 891; 385/24, 140; 398/85

(56) References Cited

U.S. PATENT DOCUMENTS

| 5,559,387 A | 9/1996 | Beurrier |
| 5,638,222 A * | 6/1997 | Shigehara .................... 359/814 |
| 5,684,632 A * | 11/1997 | Shimizu ...................... 359/578 |
| 6,700,690 B1 * | 3/2004 | Buchsbaum et al. ........ 359/230 |
| 2003/0174424 A1 * | 9/2003 | Hart et al. ................... 359/889 |
| 2003/0175006 A1 * | 9/2003 | Wilderman et al. ......... 385/147 |

FOREIGN PATENT DOCUMENTS

| EP | 0 808 900 A1 | 8/1994 |
| EP | 0 762 888 A2 | 3/1997 |
| EP | 0887964 A2 * | 12/1998 |

OTHER PUBLICATIONS

Spanner, K., et al., *Piezo–Translatoren, Elektronik*, Franzis Verlag GmbH, Munchen, DE., vol. 31, No. 6, Mar. 26, 1982.

* cited by examiner

*Primary Examiner*—Leo Boutsikaris
(74) *Attorney, Agent, or Firm*—Kirschstein, et al.

(57) ABSTRACT

A tuneable optical filter includes a moveable filter plate and an associated optical region for filtering an input radiation beam to provide corresponding filtered output radiation. The optical region has spatially varying filtration properties. Piezoelectric actuating elements are provided for moving the filter plate and its associated optical region relative to the beam for selecting a portion of the optical region for use in filtering the beam and thereby tuning the filter. The actuating elements are operable when driven by electrical signals to repetitively engage or be in repetitively slidable contact and thereby impart a lateral force to a surface of the filter plate for moving the optical region relative to the beam in at least one dimension. The filter is especially suitable for use in optical communication systems where there arises a need for occasional system reconfiguration involving retuning optical filters of the system.

30 Claims, 9 Drawing Sheets

Fig.3.
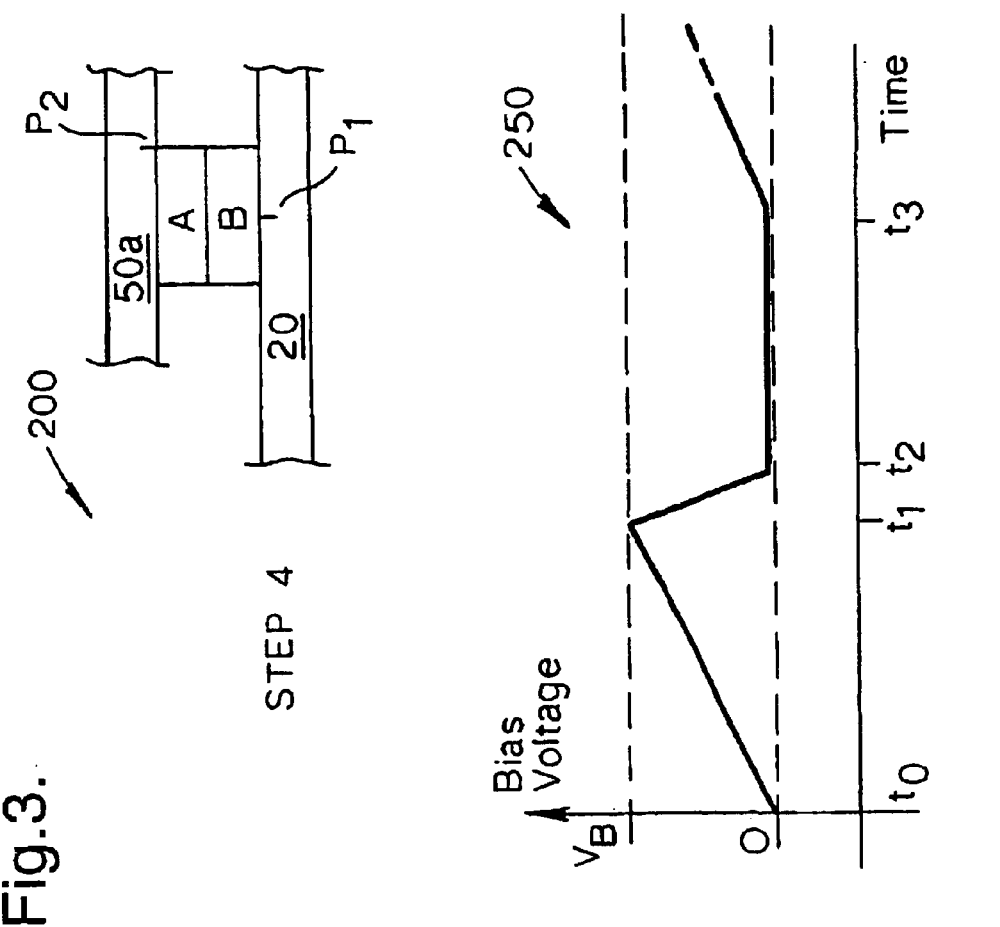
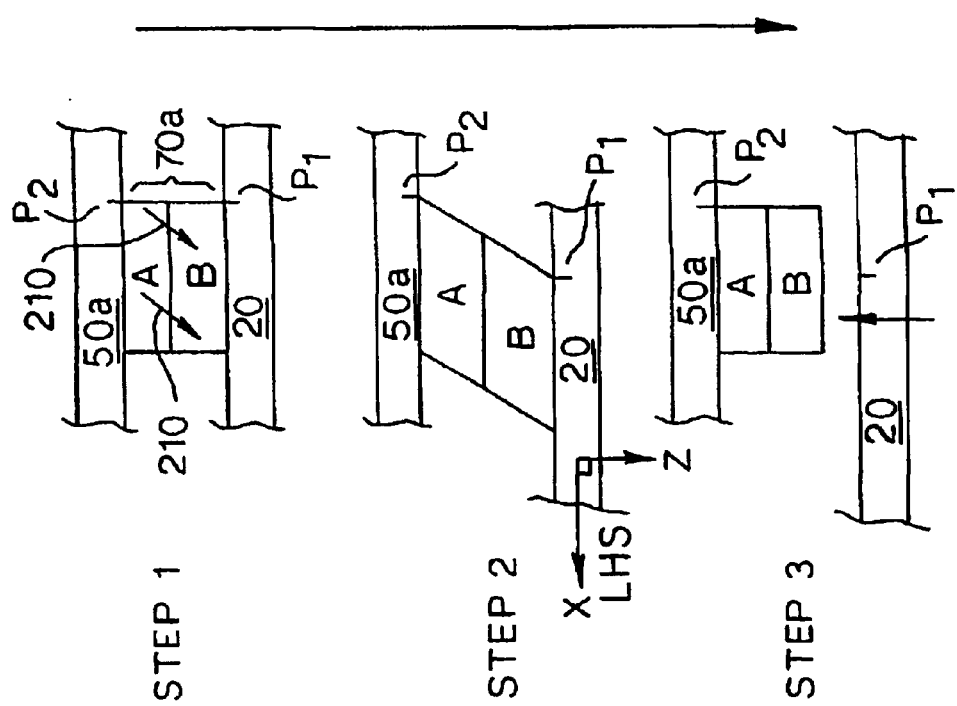

TUNEABLE OPTICAL FILTER

The present invention relates to a tuneable optical filter, for example, for use in a wavelength division multiplex (WDM) optical communication systems.

Conventional optical communication systems comprise a plurality of spatially distributed nodes interconnected through optical fibre waveguides. Information bearing optical radiation is guided by the waveguides for communicating information between the nodes. Optical radiation in the context of the present invention is defined as electromagnetic radiation having a free-space wavelength substantially in a range of 150 nm to 5 μm.

The information is often modulated onto the optical radiation in a manner of wavelength division multiplexing (WDM), namely the information is subdivided into a number of channels, each channel being modulated onto a corresponding range of optical radiation wavelengths. For example, where 1.5 μm free-space wavelength optical radiation is employed, the wavelength ranges associated with the channels can be sequentially spaced at 0.8 nm intervals. Optical radiation filters are conventionally employed in the systems for isolating radiation associated with specific channels.

When the systems are non-reconfigurable, optical filters therein are set at manufacture to radiation wavelengths of specific channels. However, it is increasingly a requirement that communication systems should be reconfigurable which necessitates such systems including optical filters tuneable over a range of at least several channels.

Although mechanically tuneable optical radiation filters are known, for example in laboratory or astronomical spectrometers, such filters are conventionally regarded as being too costly, unreliable, bulky and slow for use in modern optical communication systems where frequent tuning adjustment is required to select between channels, for example when reconfiguring nodes. Moreover, it is known that precision mechanisms suffer problems of wear when adjusted frequently, such wear giving rise to mechanical backlash which can limit adjustment accuracy; furthermore, such backlash can become worse with prolonged mechanism use. As a result, thermally tuned optical radiation filters and electronically-switchable optical filters are conventionally employed in contemporary optical communication systems.

In U.S. Pat. No. 5,459,799 there is described a tuneable optical filter for use in WDM communication systems. The filter comprises a series arrangement of reflection gratings; each grating is operable to block radiation over a wavelength range of a corresponding channel associated with the grating. Moreover, the gratings are fabricated to block mutually different channels so that the filter is normally operable to block all channels comprising WDM radiation input to the arrangement. An electrode or a heating element is provided for each reflection grating for detuning it; control signals applied to the electrodes or elements can shift the wavelength ranges of their associated gratings to be non-coincident with one or more desired channels to be selectively transmitted through the series arrangement. The arrangement suffers the disadvantage that it is not continuously tuneable; its tuning can only be switched in discrete wavelength steps corresponding to radiation blocking bandwidths of its gratings. Such discrete steps are a limitation if communication systems including such filters are to be upgraded in the future where finer wavelength steps are required, for example where channel wavelength spacings are to be reduced from 0.8 nm to 0.4 nm. Moreover, in order to obtain a fine-tuning resolution, the series arrangement needs to incorporate many reflection gratings which makes the arrangement complex and costly to manufacture.

The inventors have appreciated that it is desirable for optical communication systems to incorporate filters that are continuously tuneable, or at least tuneable in sufficiently fine wavelength steps to cope with future upgrades of the systems. Moreover, in contrast to conventional practice in optical communication system design, the inventors have appreciated that mechanically adjustable optical filters can be adapted to provide acceptable performance in future optical communication systems.

However, conventional mechanisms for precision movement of one or more filter components relative to an optical beam to be filtered through the components tend to be bulky and costly to manufacture; for example, conventional mechanically-adjustable optical filters employ stepper motors and screw drives to actuate one or more optical filter components such as optical gratings relative to an optical beam to be filtered. Moreover, such mechanisms can have limited operating lifetime when subjected to frequent adjustment, such frequent adjustment being manifest in the form of mechanical backlash. Thus, to one ordinarily skilled in the art of optical communication system design, electronically tuneable optical filters are technically preferred to mechanically tuneable optical filters in such systems.

The inventors have appreciated that it is possible to devise an alternative forming of mechanically tuneable optical filter employing an actuating mechanism which relies on step-wise stictional (that is static frictional) movement of one or more filter components relative to a beam of optical radiation to be filtered-through the one or more components.

Thus, according to a first aspect of the present invention, there is provided a tuneable optical filter comprising: moveable filtering means for filtering input radiation to provide corresponding filtered output radiation, the filtering means having spatially varying filtration properties; actuating means for moving the filtering means relative to the input radiation for selecting a portion of the filtering means for use in filtering the input radiation and thereby tuning the filter, characterised in that the actuating means comprises one or more actuating elements operable in a first phase to flex relatively slowly in a driving direction to engage with and maintain full frictional contact with the filtering means to thereby impart a lateral force for moving the filtering means relative to the input radiation in the driving direction, and operable in a second phase to flex relatively more quickly in a direction mutually opposite to the first driving direction such that frictional contact with the filtering means is lost and the filtering means remains in a displaced position.

The invention provides the advantage that it is capable of providing one or more of enhanced adjustment resolution, simpler and lower cost construction and reduced backlash in comparison to tuneable optical filters known in the art.

To provide a simple configuration for the filter, the filtering means preferably comprises a filtering structure having the spatially varying filtration properties and a moveable support member to which the filtering structure is coupled and wherein the one or more actuating elements are operable to repetitively engage with the moveable support member. Such filtering means provides the benefit that the filtering structure can be optimised for filtering the input radiation whereas the support member can be optimised for repetitively engaging the one or more actuating elements. The filtering structure can be formed or supported on a surface of the support member or alternatively be mechanically coupled to the support member.

When the filtering structure is formed or supported on a surface of the support member it is preferable that the support member has a thermal coefficient of expansion selected for compensating for changes in optical tuning characteristics of the filtering structure as a function of temperature. Such compensation assists to ensure that the filter exhibits a more stable tuning characteristic in response to changes in its ambient temperature.

In one embodiment the filtering structure is configured in a partial or complete annulus with the filtering characteristics varying in a substantially circumferential direction and the one or more actuating elements are operable to rotationally actuate the filtering structure relative to the input radiation for tuning. Rotational actuation of the filtering structure enables the filter to be made more compact.

Conveniently, the filtering structure comprises an array of discrete filter regions to provide the spatially varying filtration properties. Such an array provides the benefit that each region can, for example, have filtration properties corresponding to a wavelength division multiplexed (WDM) channel of a communication system into which the filter is accommodated, so that the filter can be tuned on a channel-to-channel basis.

Preferably, the array is a 1-dimensional array providing the benefit that the actuating means only needs to be capable of actuating the filtering means in 1-dimension for tuning the filter and thereby resulting in a relatively simple configuration for the filter.

Alternatively the array can be a 2-dimensional array. The 2-dimensional array provides the potential benefit that the filter can be made more compact compared to using a 1-dimensional array.

It is advantageous that the most frequently selected regions are arranged in relatively close mutual proximity in the filtering means so that the distance the filtering means needs to be moved relative to the input radiation for tuning purposes on average is reduced, thereby improving retuning response time of the filter. Thus, preferably, the array includes most frequently selected regions clustered together in the structure.

Where the regions, for example, the filtration properties correspond to WDM channels in an optical communication system, it is beneficial that the filter provides a fine degree of tuning control for coping with slight wavelength drift within the system. Therefore, it is beneficial that each region has spatially varying filtering properties for use in fine-tuning the filter.

Preferably the regions include one or more of optical gratings and multilayer optical etalons. Beneficially, the regions are operable to at least one of reflect and transmit the input radiation to provide the filtered output radiation; such reflection and transmission provides flexibility in the mechanical design of the filter.

In order to provide a relatively low cost and compact assembly, the moveable support member is preferably a planar member mounted between outer members and the actuating elements are interposed between the outer members and the moveable planar member. In a first such arrangement, the actuating elements are preferably bonded to the outer members and are operable to repetitively engage with the moveable planar support member and thereby impart a, repetitive lateral force thereto for moving the support member relative to the outer members and thereby moving the filtering structure relative to the input radiation for tuning the filter. This first arrangement circumvents a need for flexible electrical connections to the one or more actuating elements that would be necessary if the one or more actuating elements were bonded onto the support member. Alternatively the actuating elements are preferably bonded to the moveable support member and are operable to repetitively engage with the outer members and thereby impart a repetitive lateral force thereto for moving the support member relative to the outer members.

For achieving repetitive engagement of the actuating elements, the elements preferably operable to flex and thereby generate the reprtitive lateral force by employing one or more of piezoelectric, magnetostatic, electromagnetic, electrostatic and thermal expansion effects. Preferably, for reducing cost and achieving compactness, the actuating elements comprise one or more micro-machined components, for example silicon micro-machined components.

For low cost, compactness and relatively low voltage drive requirements, each actuating element preferably comprises a multilayer piezoelectric structure. Moreover, to obtain satisfactory step-wise motion of the filtering means relate to the input radiation, it is desirable that the one or more actuating elements should repetitively engage onto a surface of the support member or outer member with both lateral and normal force components. In order to achieve such engagement, it is preferable that each layer of the piezoelectric structure is polarised in a direction non-normal to major surfaces of the layer. Alternatively, each layer of the piezoelectric structure beneficially has an anisotropic crystalline orientation and is polarised in a substantially normal direction to major surfaces of the layer and is operable to actuate in a non-normal direction to the major surfaces when excited.

In one embodiment the support member comprises a polygonal cross-section bar onto which the one or more actuating elements are operable to impart their associated force. In practice, it is found by the inventors to be particularly beneficial for the bar to be at least one of a substantially triangular cross-section bar and a substantially rectangular cross-section bar.

According to a second aspect of the present invention, there is provided a filter structure for use in a filter according to the first aspect of the invention, the filter structure comprising an array of discrete filter regions for filtering input radiation.

According to a third aspect of the invention, there is provided a method of tuning an optical filter, the filter comprising: filtering means for filtering input radiation to provide corresponding filtered output radiation, the filtering means having spatially varying filtration properties and actuating means for moving the filtering means relative to the input radiation for selecting a portion of the filtering means for use in filtering the input radiation, characterised in that the method comprises: providing in the actuating means one or more actuating elements; and driving said one or more elements with one or more electrical drive signals in a first phase to flex relatively slowly in a driving direction to engage with and maintain full frictional contact with the filtering means to thereby impart a lateral force for moving the filtering means relative to the input radiation in the driving direction, and driving said one or more elements in a second phase to flex relatively more quickly in a direction mutually opposite to the first driving direction such that frictional contact with the filtering means is lost and the filtering means remains in a displaced position.

Embodiments of the invention will now be described, by way of example only, with reference to the following drawings in which:

FIG. 3 is a diagram showing step-wise motion of a filter plate bearing an optical grating of the tuneable filter shown in FIGS. 1 and 2;

Figure 1:
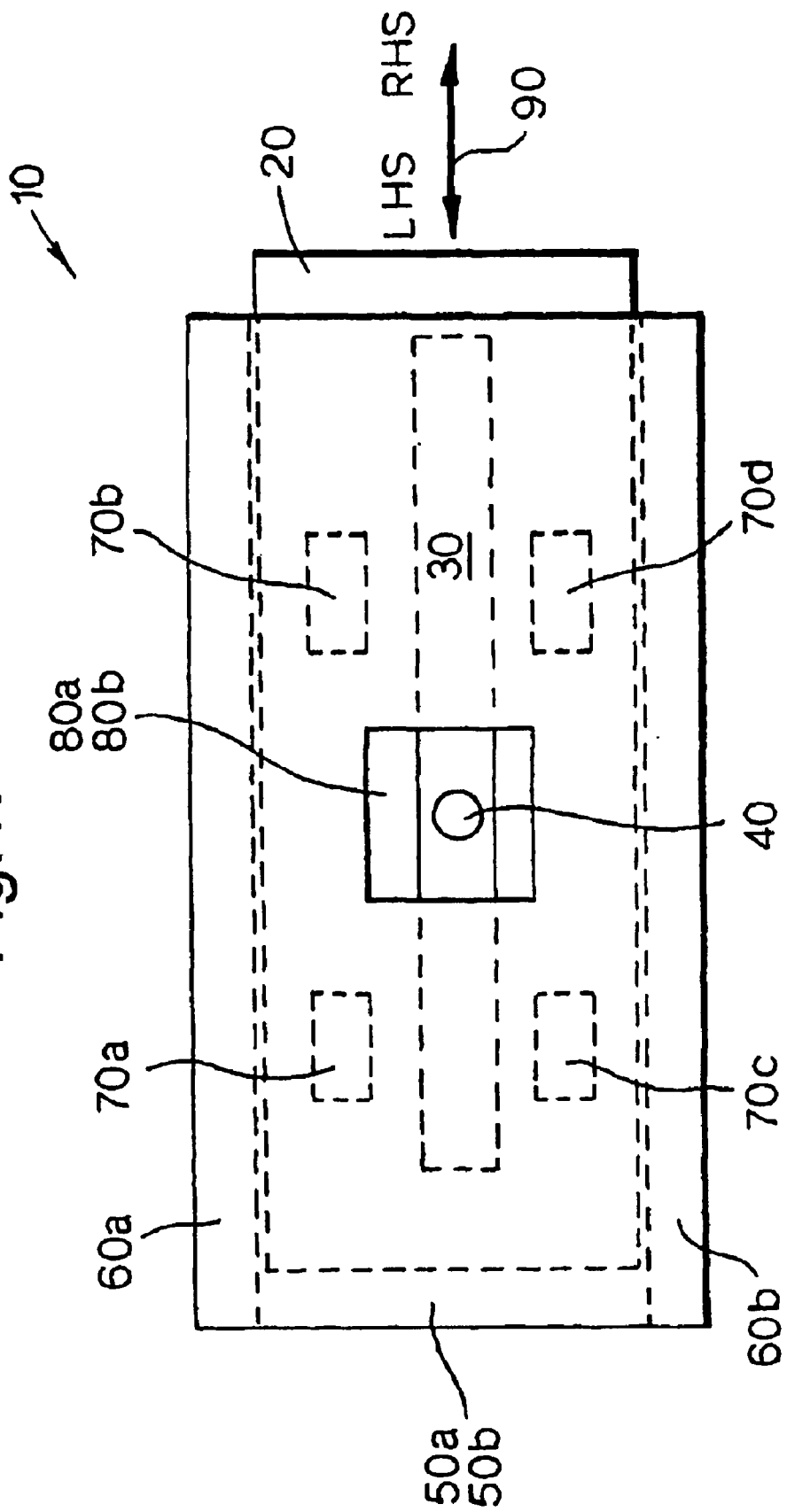
FIG. 1 is a plan-view illustration of a tuneable optical filter according to a first embodiment of the invention.
Figure 2:
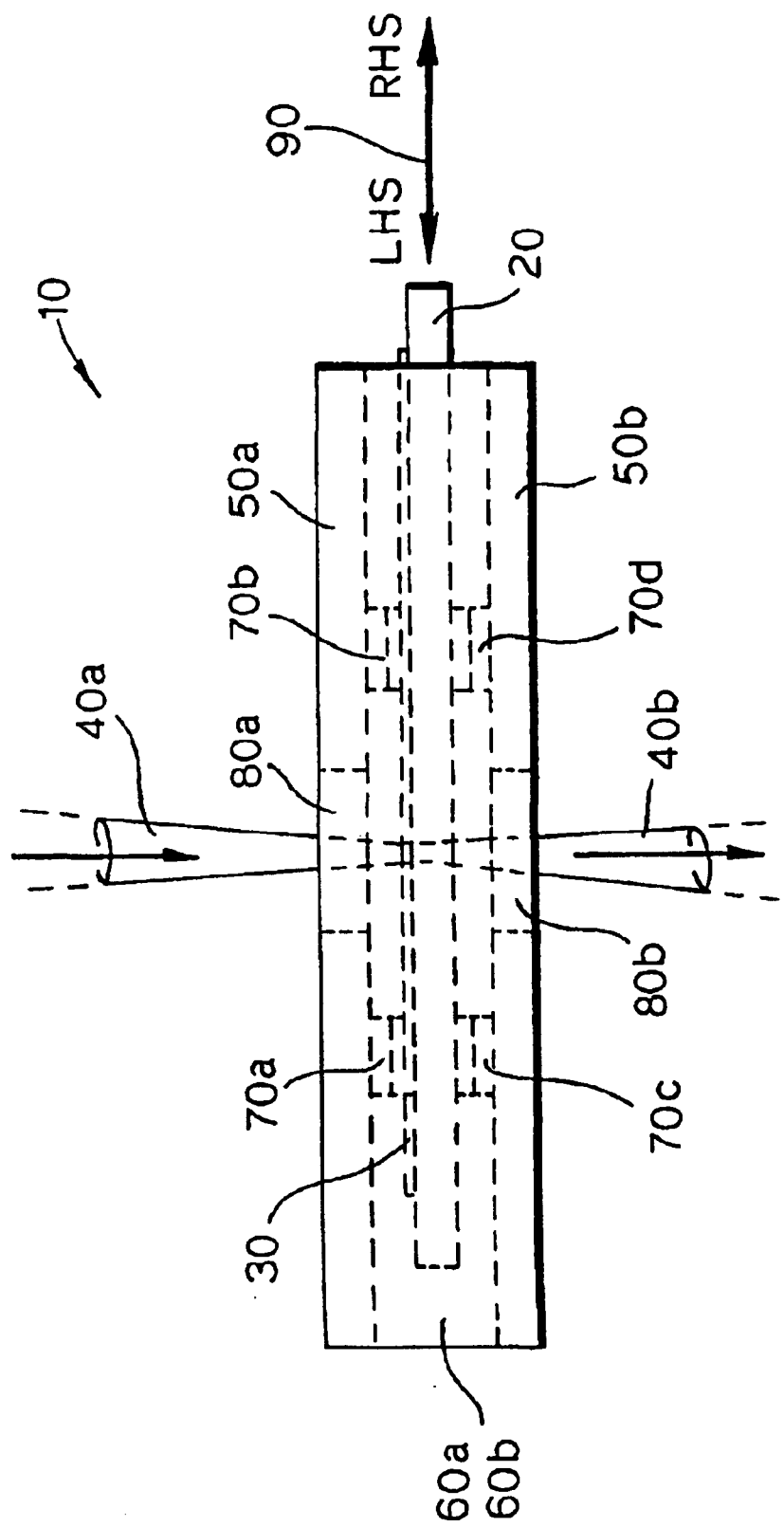
FIG. 2 is a side-view illustration of the tuneable filter shown in FIG. 1.

In FIGS. 1 and 2, there is shown a plan-view illustration of a tuneable optical filter according to a first embodiment of the invention, the filter being indicated generally by 10. The filter 10 comprises a filter plate 20 onto which is formed an optical region 30 for filtering an input beam of optical radiation 40a to provide a corresponding output filtered beam of radiation 40b.

The region 30 is a grating structure having a spatially varying grating period that varies in a direction left to right as illustrated. Alternatively, the region can be a multi-layer diffraction structure having spatially varying layer thicknesses. The filter plate 20 is slidably mounted between upper and lower exterior plates 50a, 50b which are spaced apart by spacing members 60a, 60b. The exterior plates 50a, 50b are bonded to the spacing members 60a, 60b to form a unitary assembly. Piezoelectric elements 70a, 70b, 70c, 70d are bonded onto major inward facing surfaces of the exterior plates 50a, 50b, the elements 70 abutting onto the filter plate 20. So that the beams 40a, 40b can more efficiently access the filter plate 20, mutually aligned apertures 80a, 80b are formed into the exterior plates 50a, 50b respectively.

The filter plate 20 is manufactured from fused silica material which polished to a mirror finish with its major faces parallel to better than 10 $\mu$m. Instead of using fused silica, the plate 20 can alternatively be fabricated from a material that exhibits a relatively low coefficient of thermal expansion, for example a coefficient of expansion of less than 5 p.p.m./° C. Indeed, it is especially beneficial if the material used to fabricate the plate 20 has a coefficient of thermal expansion that substantially compensates for changes in optical property with temperature of the optical region 30. Suitable low expansion coefficient materials include Kovar, Invar and Super Invar that are available from Eagle Alloys Corp., USA. Kovar, Invar and Super Invar are registered trade marks of CRS Holding.

The exterior plates 50a, 50b and the spacing members 60a, 60b are fabricated from silica or silicon; the plates 50a, 50b and their associated spacing members 60a, 60b can alternatively be fabricated from a hard metal, for example polished stainless steel. Preferably, thermal expansion coefficients of the filter plate 20 should be substantially matched, for example to within 1 p.p.m./° C., to corresponding expansions of the exterior plates 50a, 50b and the spacing members 60a, 60b.

In operation, the input radiation beam 40a propagates through the aperture 80a and is incident on a part of the optical region 30. The region 30 transmits a filtered portion of the beam 40a as the filtered beam 40b which propagates through the filter plate 20 and then through the aperture 80b away from the filter 10. To tune the filter 10 the filter plate 20 and optical region 30 are translated in a direction from left to right (as illustrated) by means of the elements 70. To tune the filter 10 in a left-hand-side (LHS) direction as indicated by arrow 90, the elements 70a, 70c are driven by at least one electrical signal which moves the region 30 in the LHS direction relative to the apertures 80a, 80b. Conversely, to tune the filter 10 in a right-hand-side (RHS) direction as indicated by the arrow 90, the elements 70b, 70d are driven by at least one electrical signal which moves the region 30 in the RHS direction as indicated by the arrow 90. The one or more signals used to drive the elements 70a, 70b, 70c, 70d are generated in control electronic circuits (not shown). During operation, a relatively weak external force is applied normally to outward facing major faces of the exterior plates 50a, 50b in a direction towards the filter plate 20 to ensure contact of the elements 70a, 70b, 70c, 70d onto the filter plate 20.

The one or more signals applied to the elements 70a, 70b, 70c, 70d provide step-wise motion of the filter plate 20 relative to the elements. In such motion, the drive signals include two distinct phases:

(a) in a first phase, one or more of the elements flex relatively slowly in a first driving direction whilst retaining full frictional contact with the filter plate 20 and thereby imparting momentum to the plate 20; and (b) in a second phase the one or more of the elements flex relatively quickly in a second direction mutually opposite to the first direction during which contact of the one or more elements with the plate 20 is momentarily lost whilst the elements return to their former position prior to commencing the first phase; contact is lost because the filter plate 20 and the exterior plates 50a, 50b have considerably greater inertia than the elements 70a, 70b, 70c, 70d.

Thus, the elements 70a, 70c are flexed relatively slowly during the first phase in the LHS direction for actuating the filter plate 20 in the LHS direction and are flexed relatively rapidly during the second phase in the RHS direction. In a similar manner, the elements 70b, 70d are flexed relatively slowly during the first phase in the RHS direction for actuating the filter plate 20 in the RHS direction and are flexed relatively rapidly during the second phase in the LHS direction. The elements 70a, 70b, 70c, 70d are each polarised too have a specific direction of actuation. Thus, the elements 70a, 70c are polarised and bonded onto the exterior plates 50a, 50b in an orientation to drive the filter plate 20 in a LHS direction as illustrated in FIGS. 1 and 2. Moreover, the elements 70b, 70d are polarised and bonded onto the exterior plates 50a, 50b in an orientation to drive the filter plate 20 in a RHS direction as illustrated.

The elements 70a, 70b, 70c, 70d each comprise one or more layers of a piezoelectric material such as lead zirconate titanate (PZT) bonded together in a stack. The layers can be glued using a low-creep hard epoxy resin, for example as available from Ciba Geigy, or soldered using a relatively low melting point eutectic solder.

Steps in actuation operation of the element 70a are indicated by 200 in FIG. 3. The element 70a comprises a first layer B and a second layer A which, in turn, is bonded to the exterior plate 50a. An end face of the first layer B remote from the exterior plate 50a is arranged to abut in stictional (static frictional) contact onto a major surface of the filter plate 20. Metallic electrodes (not shown) are deposited during manufacture of the element 70a onto major faces of the layers A, B for receiving drive signals from the control circuits, the drive signals resulting in the generation of an electric field in the element 70a orientated in a normal direction to major surfaces of the exterior plate 50a. Metallic connection tracks (not shown) on a major surface of the exterior plate 50a connect from the element 70a to the control circuits, the connection tracks being vacuum-deposited metal tracks, for example aluminium tracks of 2 $\mu$m thickness.

The element 70a is polarised in a direction as illustrated by arrows 210 which, when the element 70a is bonded to the exterior plate 50a, is orientated non-normally to major surfaces of the exterior plate 50a. When the electric field is applied to the element 70a, it flexes in a manner as illustrated in STEP 2 in FIG. 3, namely both shearing and thickening itself.

Alternatively, the element 70a can comprise a piezoelectric polycrystalline material having an anisotropic crystal orientation in the direction of the arrows but polarised in a direction normal to planes parallel to major surfaces of the layers A, B.

Operation of the element 70a actuating the filter plate 20 will now be described with reference to FIG. 3.

In STEP 1, there is a substantially zero bias voltage applied across the element 70a at a time $t_0$ as illustrated on a graph indicated by 250. The element 70a is in an undeflected state as illustrated such that points $P_1$ and $P_2$ on the exterior plate 50a and the filter plate 20 respectively align.

In STEP 2, between a time period $t_0$ to $t_1$, the bias voltage across the element 70a is progressively increased causing the element 70a to shear and thicken in axes X and Z respectively as shown. Contact between the remote major face of layer B and the filter plate 20 is maintained during STEP 2. During STEP 2, the filter plate 20 is translated in a LHS direction as illustrated so that the points $P_1$ and $P_2$ no longer align. Moreover, the exterior plate 50a is moved further apart from the filter plate 20a. At the end of STEP 2 at a time $t_1$, a bias voltage of magnitude $V_B$ is present across the element 70a.

In STEP 3, between a time period $t_1$ to $t_2$ which is shorter than the time period $t_0$ to $t_1$, the bias voltage across the element 70a is rapidly decreased from $V_B$ to substantially zero. As a consequence of the element 70a having a relatively lower inertia than the plates 50a, 20, the element 70a is capable of contracting to its original shape in STEP 1 before the plates 50a, 20 have had an opportunity to change their momentum. During STEP 3, the element 70a disengages contact with the plate 20. As a consequence, the points $P_1$, $P_2$ remain mutually misaligned as at the end of STEP 2 during STEP 3.

In STEP 4, between a time period $t_2$ to $t_3$, a substantially zero bias is maintained across the element 70a to provide an opportunity for the filter plate 20 to re-engage contact onto the element 70a. When the filter plate 20 contacts again onto the element 70a, the points $P_1$ and $P_2$ are misaligned as shown corresponding to LHS lateral translation of the filter plate 20 relative to the exterior plate 50a.

In practice, STEPs 2 and 4 can be made very short such that temporal variations in the bias voltage applied to the element 70a resembles a saw-tooth waveform. However, for best accuracy of movement, a waveform as illustrated in the graph 250 is preferred, namely that the period $t_1$ to $t_2$ is in a range of 1% to 20% of the period $t_0$ to $t_1$.

If required, a resilient bias force can be applied to engage the element 70a continuously onto the plate 20 when the elements are actuated. In such a mode of operation, the layer B is in repetitively slidable contact with the plate 20.

Although operation of the element 70a is described in the foregoing with reference to FIG. 3, it will be appreciated that a number of schemes for driving the elements 70a to 70d can be adopted. For example, the elements 70a, 70c can be driven synchronously in-phase so that they simultaneously repetitively engage onto the plate 20 to actuate it in the LHS direction. Alternatively, the elements 70a, 70c can be driven synchronously but mutually de-phased so that some of the elements are retracting whilst others are reaching their full extension. Similarly, the elements 70b, 70d can be driven synchronously in-phase so that they simultaneously repetitively engage onto the plate 20 to actuate it in the RHS direction. Alternatively, the elements 70b, 70d can be driven synchronously but mutually de-phased so that some of the elements are retracting whilst others are reaching their full extension.

It will be further appreciated that the layer B can be provided at its exposed surface with micro-ridges for engaging onto the plate 20, the micro-ridges having a period in a range of 3 nm to 30 nm, namely in the order of 10 nm. Likewise, the plate 20 where it engages onto the elements 70a to 70d can also be provided with micro-ridges at a period in a range of 3 nm to 30 nm, also namely in the order of 10 nm, the micro-ridges of the plate 20 being aligned parallel to those of the layer B and cooperating therewith so that the elements 70a to 70d are operable to provide a step size defined by the ridges. The ridges can be formed, for example, by exploiting soft X-ray or deep UV interference fringes translated via organic polymer photosensitive resist to a metallic layer by ion-beam milling techniques. Polymer photosensitive resists are routinely used in the semiconductor industry and are manufactured by companies such as Shipley Inc. The ridges are operable to provide a form of toothed cooperative engagement between the elements 70a to 70d and the plate 20 and hence provide greater control accuracy.

It is found in practice that rates of actuation in a range of 3 mm/s to 5 mm/s are achievable when appropriate saw-tooth type drive signals of around 500 kHz frequency are applied to one or more of the elements 70a to 70d, each stiction step corresponding to substantially 10 nm. The size of each stiction step corresponding to one flexure of one or more of the piezoelectric elements 70a to 70d can be varied by modulating the amplitude of the drive signal applied from the control circuits. Thus, by controlling both amplitude and frequency of drive signals, actuation rates in the order of 5 mm/s and step size adjustment to within a few nm can be achieved. Such performance is a considerable improvement on conventional mechanical movements for tuneable optical filters and provides:

a higher degree of stability than many electronically tuneable filters, for example thermally tuneable filters; and a faster response than many conventional mechanically tuneable optical filters.

Figure 4:
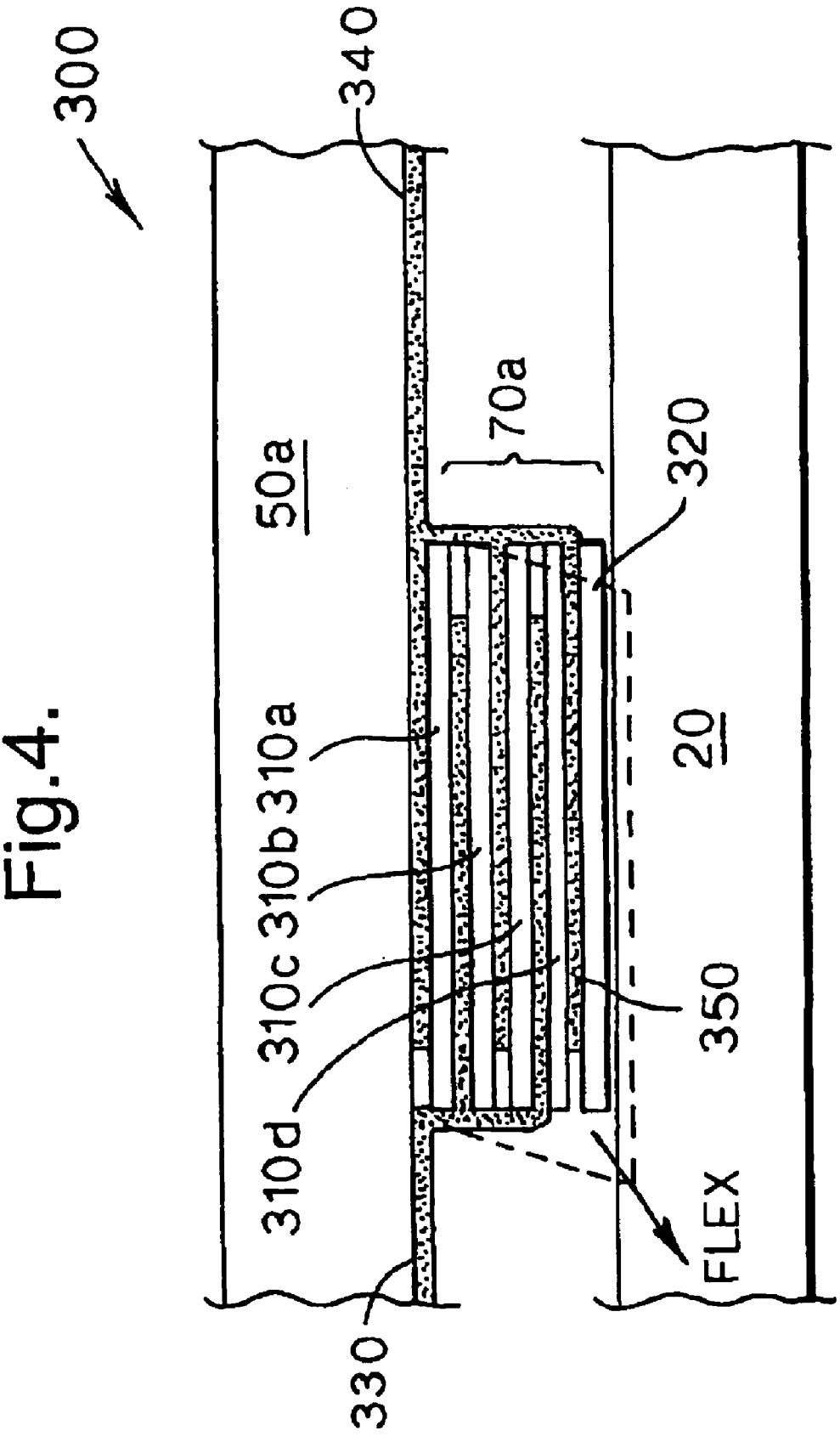
FIG. 4 is an illustration of electrical connections in a multilayer piezoelectric element usable to actuate the filter plate shown in FIGS. 1 to 3.

Referring now to FIG. 4, there is indicated by 300 the element 70a in side view implemented as a 5-layer stack of piezoelectric layers 310a, 310b, 310c, 310d and a guard layer 320. The piezoelectric layers 310a, 310b, 310c, 310d are electrically connected in parallel to two vacuum-deposited metallic connection tracks 330, 340, the layers being interconnected in an interleaved manner as shown. In order to prevent an outermost electrode 350 of the stack being abraded by movement of the filter plate 20, the stack includes the guard layer 320 which contacts onto the filter plate 20. Parallel connection of the piezoelectric plates 310a, 310b, 310c, 310d enables a higher electric field to be generated for a given applied drive voltage in comparison to implementing the element 70a as a single layer of piezoelectric material. However, such parallel connection as illustrated in FIG. 4 results in increased capacitive loading to output drivers included within the aforementioned control circuits although it enables modest signals of a few volts amplitude, for example from logic gates and drivers, to drive the element 70a. If required, the guard layer 320 can be provided on its exterior surface with the micro-ridges for providing a more accurately defined step size.

Figure 5:
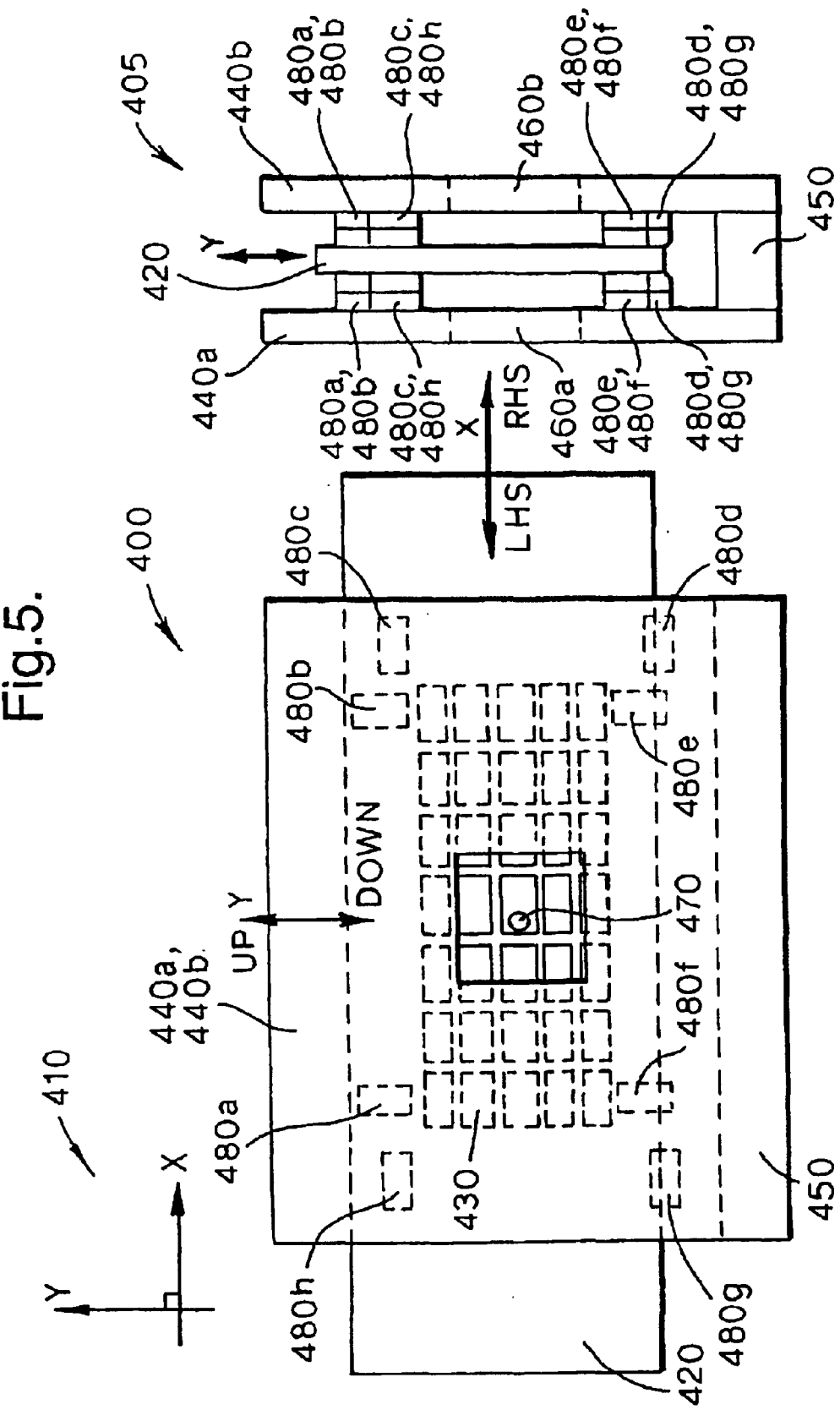
FIG. 5 is a diagram of a tuneable optical filter according to a second embodiment of the invention, the filter including an optical filter component capable of 2-dimensional movement relative to an optical beam to be filtered, the component incorporating a 2-dimensional array of filter regions.

The optical filter 10 illustrated in FIGS. 1 and 2 is operable to actuate the filter plate 20 relative to the exterior plates 50a, 50b in a 1-dimensional linear trajectory. The present invention is also applicable to actuating an optical plate in 2-dimensions. A second embodiment of the present invention is illustrated in FIG. 5 wherein there is shown generally indicated by 400 an alternative tuneable optical filter in plan view. The tuneable filter 400 is also illustrated in end view as indicated by 405. X-Y orthogonal reference axes are indicated by 410 and are to be associated with the filter 400 in plan view.

The tuneable filter 400 comprises a filter plate 420 which is slidably mounted between two exterior plates 440a, 440b which are maintained by a spacing member 450 in spaced apart configuration as illustrated. The exterior plates 440a, 440b and the spacing member 450 form a unitary assembly. The filter plate 420 includes an array of 35 filter regions, for example a filter region 430. Bonded onto major faces of the exterior plates 440a, 440b facing towards the filter plate 420 are piezoelectric elements 480a to 480h; these elements 480a to 480h are identical in construction to the elements 70a, 70b, 70c, 70d of the tuneable filter 10 and are interposed between the filter plate 420 and the exterior plates 440a, 440b. The exterior plates 440a, 440b include access apertures 460a, 460b through which a beam of radiation 470 impinges onto the filter plate 420 and exits there from.

The elements 480a to 480h operate in a manner as described with reference to FIG. 3, namely a stepped stictional actuation for moving the filter plate 420 relative the apertures 460a, 460b and hence the beam 470. In the context of the present patent application stictional motion is to be understood as meaning motion which involves use of static friction (stiction between two surfaces to impart lateral force between the surfaces. The elements 480a, 480b, 480e, 480f are operable when driven to move the filter plate 420 in a parallel to the y axis. Likewise, the elements 480c, 480d, 480g, 480h are operable when driven to move the plate 420 in a direction parallel to the x axis.

The elements 480g, 480h have their non-normal polarisation direction orientated in a LHS x direction for moving the filter plate 420 in a LHS direction when driven with signals from the control circuits. Conversely, the elements 480c, 480d have their non-normal polarisation direction orientated in a RHS x direction for actuating the plate 420 in a RHS direction when driven.

In a similar manner, the elements 480a, 480b have their non-normal polarisation direction orientated in a UP y direction for moving the filter plate 420 in an upwards y direction when driven with signals from the control circuits. Conversely, the elements 480e, 480f have their non-normal polarisation direction orientated in a DOWN y direction for actuating the plate 420 in a downwards y direction when driven.

The regions in the array on the filter plate 420 are diffraction gratings, each region providing a mutually different filtration characteristic which is substantially constant over the region. The regions can alternatively comprise multi-layer optical structures whose layer thicknesses and number of layers varies from region to region to provide a range of different filtration characteristics. Moreover, within each region, optical filtration characteristics provided can be spatially constant; alternatively, each region can be spatially graded to provide an element of optical tuneability to each region. For example, each of the regions can correspond to a wavelength division multiplexed channel when the filter 400 is incorporated into an optical communication system for performing optical filtration therein; where each region corresponds to a specific WDM channel of an optical communication system, each region can have an optical filtration characteristic which varies spatially a relatively small amount across the region thereby providing rapid tuning between WDM channels and a relatively small range of tuning adjustment within each channel. Additionally, the filter 400 provides the benefit that, if incorporated in a WDM optical communication system, if the system is upgraded to include more channels or channel spacings are changed, for example from 0.8 nm spacings to a new regime of 0.4 nm spacings, the filter 400 can be upgraded merely by replacing its filter plate 420 with a corresponding replacement plate including an array whose regions are tuned to the new regime.

The filter 400 provides the benefit in comparison to the filter 10 in that it can be made more physically compact. Moreover, from an operational viewpoint, the filter 400 can be tuned from channel to channel more rapidly than if the regions, for example the region 430, were arranged in a linear sequence in a manner as in the filter 10. The regions can be spatially X arranged in ascending or descending order as a function of radiation wavelength that they are designed to filter. Alternatively, frequently selected regions can be clustered together on the filter plate 420 to enable more rapid channel switching to be achieved.

In operation, relatively weak forces can be applied to outwardly facing major surfaces of the exterior plates 440a, 440b and directed towards the filter plate 420 for ensuring that the elements 480a to 480h are maintained in contact with the filter plate 420 except when driven when momentary disengagement occurs as described in the foregoing.

The exterior plates 440a, 440b and the filter plate 420 are preferably fabricated from fused silica or quartz, their surfaces being polished to a mirror finish and parallel to less than 10 $\mu$m error prior to forming the array of regions there onto.

Figure 6:
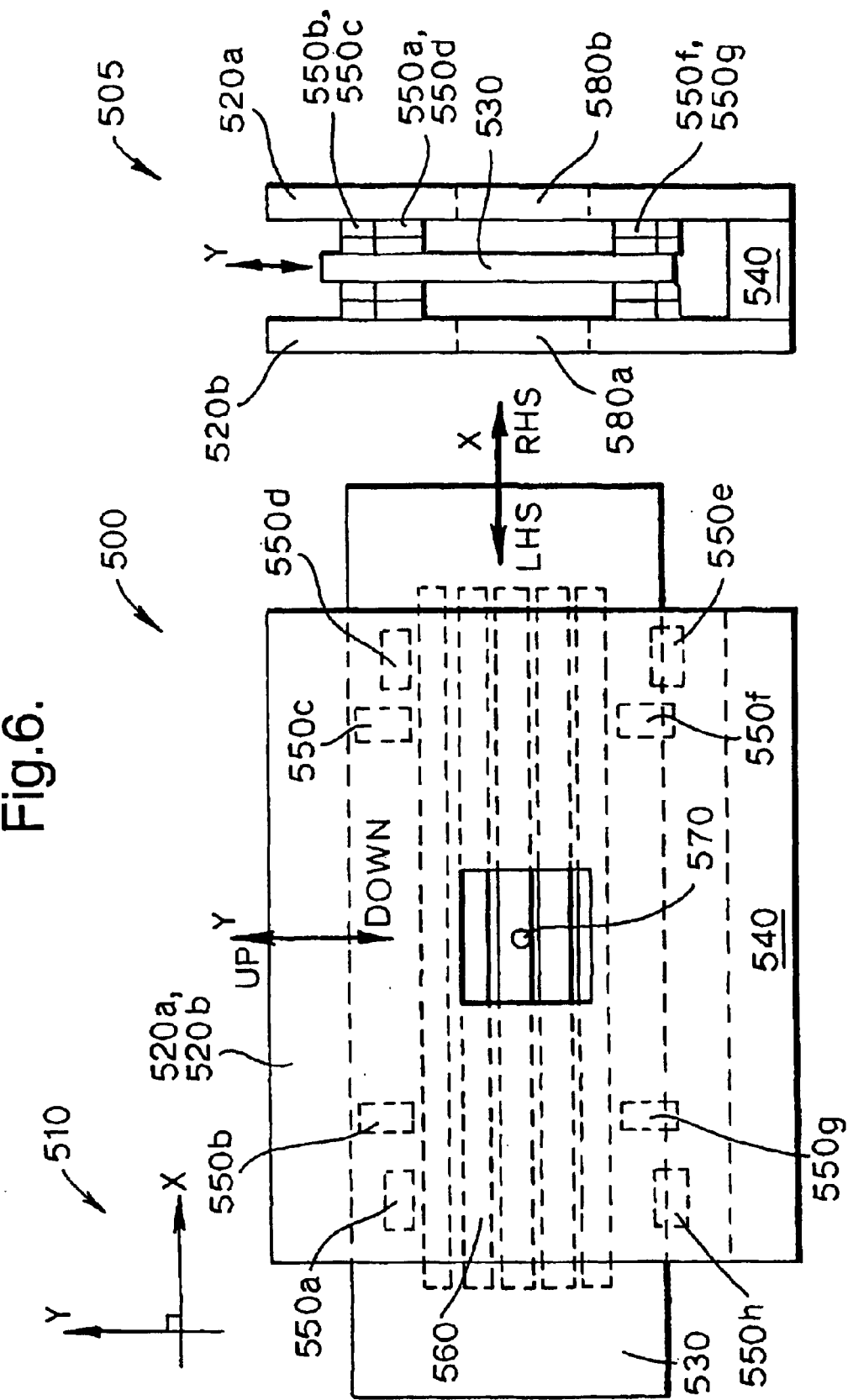
FIG. 6 is an illustration of a tuneable optical filter according to a third embodiment of the invention, the filter including an optical filter component capable of 2-dimensional movement relative to an optical beam to be filtered, the component incorporating a series of parallel elongate grating filters.

A third embodiment of the present invention is illustrated in FIG. 6 wherein there is shown generally indicated by 500 a further alternative tuneable optical filter in plan view. The tuneable filter 500 is also illustrated in end view as indicated by 505. x-y orthogonal reference axes are indicated by 510 and are to be associated with the filter 500 in plan view.

The tuneable filter 500 comprises a filter plate 530 which is slidably mounted between two exterior plates 520a, 520b which are maintained by a spacing member 540 in spaced apart configuration as illustrated, the exterior plates 520a, 520b and the spacing member 540 forming a unitary assembly. The filter plate 530 includes a linear array of five elongate filter regions, for example an elongate filter region 560. Bonded onto major faces of the exterior plates 520a, 520b facing towards the filter plate 530 are piezoelectric elements 550a to 550h; these elements 550a to 550h are identical in construction to the elements 70a, 70b, 70c, 70d of the tuneable filter 10 and are interposed between the filter plate 530 and the exterior plates 520a, 520b. The exterior plates 520a, 520b include access apertures 580a, 580b through a beam of radiation 570 impinges onto the filter plate 530 and exits there from.

The elements 550a to 550h operate in a manner as described with reference to FIG. 3, namely a stepped stictional actuation for moving the filter plate 530 relative the apertures 580a, 580b and hence the beam 570. The elements 550a, 550d, 550e, 550h are operable when driven to move the filter plate 530 in a direction parallel to the x axis. Likewise, the elements 550b, 550c, 550f, 550g are operable when driven to move the plate 530 in a direction parallel to the y axis.

The elements 550a, 550h have their non-normal polarisation direction orientated in a LHS x direction for moving the filter plate 530 in a LHS direction when driven with signals from the control circuits. Conversely, the elements 550d, 550e have their non-normal polarisation direction orientated in a RHS y direction for actuating the plate 530 in a RHS direction when driven.

In a similar manner, the elements 550b, 550c have their non-normal polarisation direction orientated in a UP y direction for moving the filter plate 530 in an upwards y direction when driven with signals from the control circuits. Conversely, the elements 550f, 550g have their non-normal polarisation direction orientated in a DOWN y direction for actuating the plate 530 in a downwards y direction when driven.

The elongate regions in the linear array on the filter plate 530 are diffraction gratings, each region providing a mutually different filtration characteristic. The regions can alternatively comprise multi-layer optical structures whose layer thicknesses and number of layers varies from region to region to provide a range of different filtration characteristics. Moreover, within each region, optical filtration characteristics are spatially graded in an x direction to provide a degree of optical tuneability to each region. For example, each of the regions can correspond to a range of wavelength division multiplexed channels when the filter 500 is incorporated into an optical communication system for performing optical filtration therein.

The filter 500 provides the benefit in comparison to the filter 10 in that it can be made more physically compact. Moreover, the filter 500 is also potentially continuously tuneable over a greater range of wavelengths. Moreover, from an operational viewpoint, the filter 500 can be tuned from channel to channel more rapidly than if the regions, for example the region 560, were arranged in a linear sequence in a manner as in the filter 10. For example, the filter 500 may be tuned such that the region 560 is manoeuvred so that a first end thereof is aligned with the beam 570; if there arises a need to tune the filter 500 to another wavelength at a second end of the region 560, the control circuit can manoeuvre a neighbouring region to the region 560 providing filtration at the other wavelength rather than translating the filter plate 530 the full length of the region 560.

In operation, in a similar manner to the filter 500, relatively weak forces can be applied to outwardly facing major surfaces of the exterior plates 520a, 520b and directed towards the filter plate 530 for ensuring that the elements 550a to 550h are maintained in contact with the filter plate 530 except when driven when momentary disengagement occurs as described in the foregoing, especially with reference to FIG. 3.

The exterior plates 520a, 520b and the filter plate 530 are preferably fabricated from fused silica or quartz, their surfaces being polished to a mirror finish and parallel to less than 10 μm error prior to forming the array of regions there onto.

Figure 7:
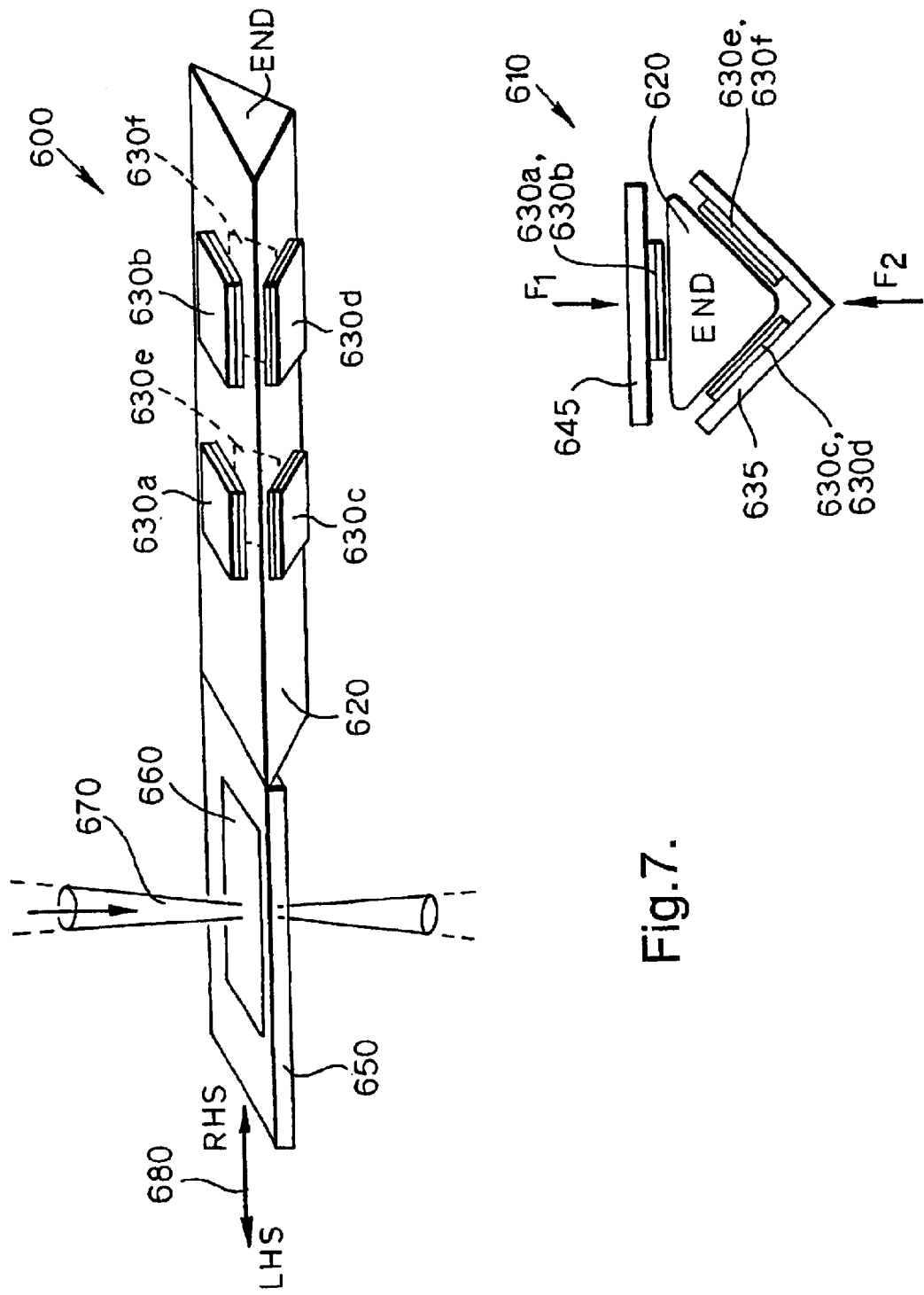
FIG. 7 is a diagram of a tuneable optical filter according to a fourth embodiment of the invention, the filter including an actuatable triangular member for moving an optical filter component relative to an optical beam to be filtered.

In the forgoing, tuneable optical filters 10, 400, 500 based on plates are described. Stictional-mode actuation according to the invention can also be achieved using other types of members. FIG. 7 is an illustration of an alternative tuneable optical filter indicated by 600. A side view of the filter 600 is indicated by 610. The filter 600 includes an elongate triangular member 620 held in slidable contact with six piezoelectric elements 630a to 630f. The elements 630a to 630d are bonded to an angled support member 635, and the elements 630e, 630f are bonded to a support plate 645. The support plate 645 and support member 635 are prevented from relative movement with respect to each other in a direction 680 by suitable means (not shown). Relatively weak forces $F_1$ and $F_2$ are applied to the support member 635 and the support plate 645 respectively to ensure that the elements 630a to 630f are maintained in contact with the member 620 except momentarily when drive signals are applied to one or more of the elements 630a to 630f. The elements 630a, 630c, 630e have their piezoelectric polarisation axes orientated so as to actuate the elongate member 620 in a LHS direction as indicated by an arrow 680 when driven by signals from control circuits (not shown) associated with the filter 600. Likewise, the elements 630b, 630d, 630f have their piezoelectric polarisation axes orientated so as to actuate the member 620 in a RHS direction as indicated by the arrow 680 when driven by signals from the control circuits. Optical components (not shown) such as lenses are arranged to form an optical radiation beam 670 which, in operation, is incident on the region 660 and filtered when transmitted there through.

The elongate member 620 is attached at one end thereof to a filter plate 650 bearing an elongate filter region 660. The filter region 660 comprises a diffraction grating whose period varies spatially along the region 660 to impart to the region a spatially varying optical filtration characteristic.

The filter 600 provides the benefit that the elongate member 620 actuator arrangement can be used to actuate existing designs of optical filter plate represented by the plate 650. Hence, the filter 600 can be used as an upgrade of present optical filters employing linear actuation and optical filter plates.

Although use of the elongate triangular member 620 is described, the filter 600 can be adapted to use other types of moveable member, for example an elongate square cross-section member or an elongate hexagonal cross-section member, provided that appropriate supporting structures are provided for piezoelectric elements to abut onto and thereby actuate these types of member.

Figure 8:
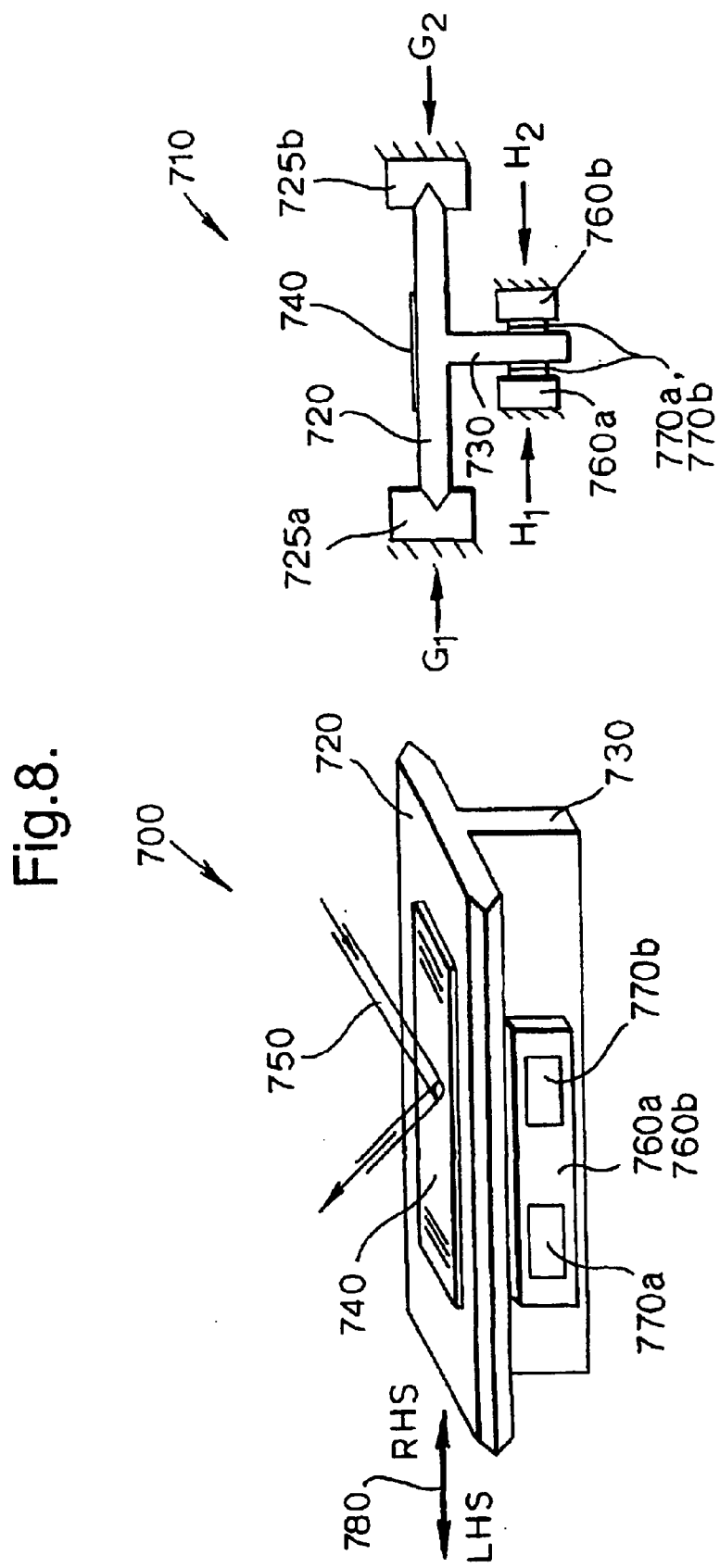
FIG. 8 is a diagram of a tuneable optical filter according to a fifth embodiment of the invention, the filter including a planar member orthogonally coupled to an optical filter region, the planar member being actuated to move the optical filter region relative to an optical beam to be filtered.

Further types of tuneable optical filter have been devised by the inventors. For example, FIG. 8 is an illustration of a tuneable optical filter according to a fifth embodiment of the invention, the filter indicated by 700. The filter 700 is also shown in end view as indicated by 710. The filter 700 includes a planar stage 720 having an orthogonal vane member 730 integral to the stage 720 providing the stage with a "T"-shaped cross-section as shown. The planar stage 720 comprises bevelled elongate edges which engage into "V"-shaped elongate grooves in complementary support members 525a, 525b. The support members 525a, 525b are resiliently biased, for example using leaf springs, towards the planar stage 720 by applied forces $G_1$, $G_2$ to reduce backlash. On an upper exposed surface of the stage 720, remote from where the vane 730 joins the stage 720, is fabricated an optical filter region 740 having a grating period which varies spatially along the region 740 in a direction of travel 780 of the stage 720. The region 740 can alternatively be a multilayer optical structure whose optical characteristics vary spatially along the region 740; the structure can, for example, be a multilayer etalon reflective structure whose layer thickness or layer refractive index varies spatially along the region 740.

The vane member 730 is flanked by support members 760a, 760b at both major faces of the vane member 730. Each support member 760a, 760b has bonded thereto two piezoelectric elements 770a, 770b capable of providing stictional actuation of the vane member 730 in a manner as illustrated in FIG. 3 and described in the foregoing. The elements 770a, 770b are held in contact with the vane member 730 by forces $H_1$, $H_2$ directed inwardly normally towards the major faces of the vane member 730. The elements 770a, 770b only lose contact momentarily with the vane member 730 during stictional motion when the elements 770a, 770b are driven with drive signals from associated control electronic circuits.

The piezoelectric elements 770a are bonded to the support members 760a, 760b such that directions of polarisation of the elements 770a are orientated towards a LHS direction as indicated by an arrow 780. As a consequence of this orientation, the elements 770a are operable when driven by signals applied thereto to actuate the vane member 730 and hence the stage 720 in a LHS direction relative to the support members 725a, 725b, 760a, 760b, these support members being mechanical held in substantially mutually constant spatial relationship.

Similarly, the piezoelectric elements 770b are bonded to the support members 760a, 760b such that directions of polarisation of the elements 770b are orientated towards a RHS direction as indicated by the arrow 780. As a consequence of this orientation, the elements 770b are operable when driven by signals applied thereto to actuate the vane member 730 and hence the stage 720 in a RHS direction relative to the support members 725a, 725b, 760a, 760b.

It will be appreciated by those skilled in the art that modifications can be made to the optical filters 10, 400, 500, 600, 700 without departing from the scope of the invention. For example, although stictional movement of optical filters relative to radiation beams using piezoelectric elements is described, other types of elements capable of providing a flexural motion as illustrated in FIG. 3 could be employed. Electrostatic elements, magnetostatic elements, electromagnetic elements and thermally flexed elements such a bimorphs may alternatively or additionally be employed to impart the stictional motion. Silicon micro-machined elements employing electrostatic, electromagnetic, thermal or piezoelectric actuated structures are especially appropriate for the invention.

The piezoelectric elements used in the filters 10, 400, 500, 600, 700 can be driven by associated control electronic circuits temporally in sequence with some elements contacting and weakly holding whilst one of the elements provide actuation. Conversely, the piezoelectric elements can be driven in groups of two or more at any instance whilst undriven elements are weakly contacting and holding. A regime chosen for driving the elements will depend upon the accuracy and speed with which optical filter plates or stages described in the foregoing are to be actuated.

Although the piezoelectric elements included within the filters 10, 400, 500, 600, 700 are bonded onto supporting parts of the filters which move relative to the filter regions 30, 430, 560, 660, 740 respectively, it is feasible to bond the elements to remain in fixed relative position to the filter regions and actuate stictionally with respect to the supporting parts; for example, in the tuneable filter 10, the elements 70a 70d can be bonded onto the filter plate 20 and actuate in slidable engagement with inwardly facing major surfaces of the exterior plates 50a, 50b; flexible conductors from the filter plate 20 connected to the associated control circuits are required for such a configuration.

Figure 9:
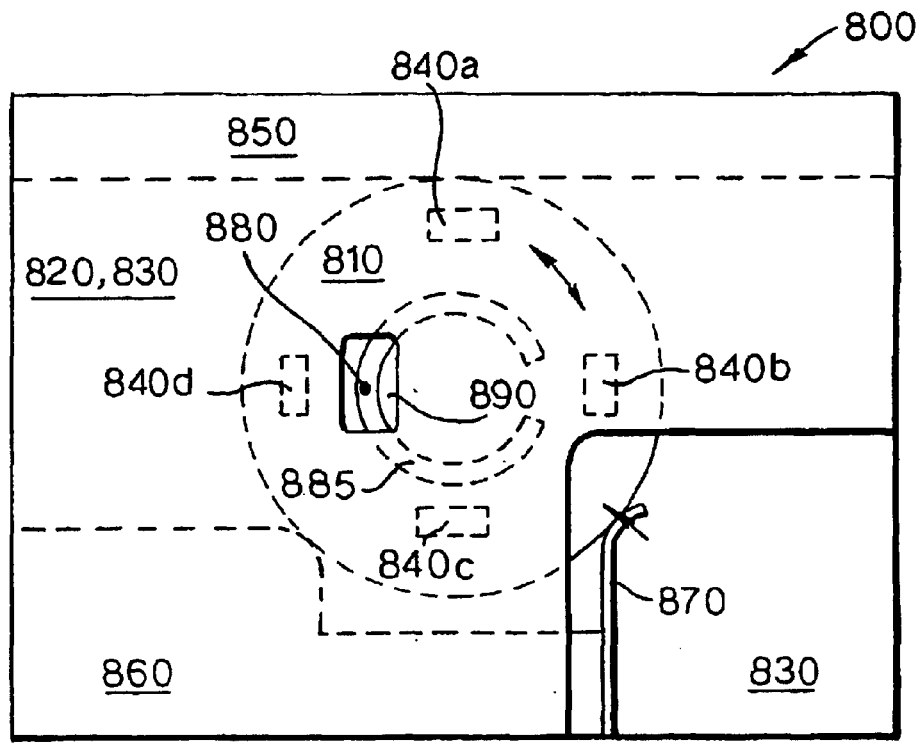
FIG. 9 is a plan view diagram of a tuneable optical filter according to a sixth embodiment of the invention, the filter including a filter structure arranged to be rotationally actuated relative to an optical beam to be filtered.
Figure 10:
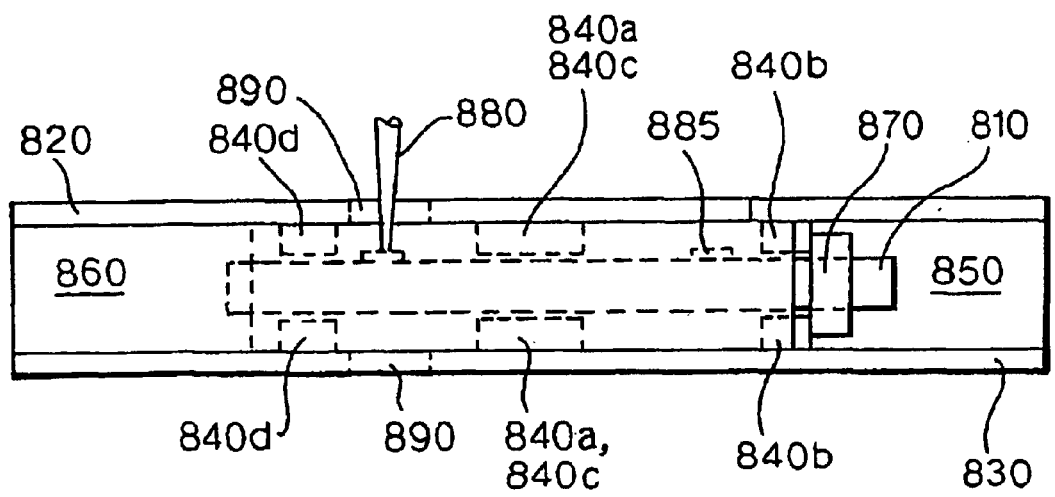
FIG. 10 is a side view diagram of the tuneable filter shown in FIG. 9.

It will further be appreciated that the filters 10, 400, 500, 600, 700 can be modified so that actuated structures, for example the plate 20 in the filter 10, are rotationally mounted so that their associated piezoelectric elements are operable to rotate the structures to affect tuning of the filters by moving optical regions on the structures relative to optical beams directed at the structures. For example, there is shown in FIGS. 9 and 10 diagrams of a tuneable optical filter according to the invention, the filter indicated by 800 and including a circular filter plate 810 rotationally mounted between two support plates 820, 830 with piezoelectric elements 840a, 840b, 840c, 840d included between the filter plate 810 on both major faces thereof and the support plates 820, 830. The support plates 820, 830 are coupled together by way of spacer members 850, 860 which are operable to abut at two locations onto the circular plate 810. A biasing member 870, namely a compliant phosphor-bronze spring, resiliently mounted with respect to the support plates 820, 830 and the spacer members 850, 860 is arranged to abut onto the circular plate 810 at a third location. The biasing member 870 is operable to prevent the circular plate 810 from moving laterally in its plane relative to the spacer members 850, 860 and the support plates 820, 830. The circular plate 810 is substantially prevented from moving in an out-of-plane direction by the piezoelectric elements 840a, 840b, 840c, 840d. If necessary, biasing forces can be applied to the support plates 820, 830 in a direction towards the circular plate 810 to assist to prevent backlash and ensure that the elements 840a, 840b, 840c, 840d are maintained in operation in repetitive slidable contact with the circular plate 810 for actuating the circular plate 810 in a rotational manner relative to an input optical beam 880 to be filtered. If the biasing forces are not applied, the elements 840a, 840b, 840c, 840d are, in operation, in repetitive contact with the circular plate 810 for actuating it in a rotational manner relative to the beam 880. The circular member 810 includes an annular filter region 885 accessible through apertures 890 in the support plates 820, 830. The region 885 has a spatially varying optical filtration characteristic. Furthermore, the region 885 can be arranged to be a complete annulus. Alternatively, the filter region 885 can optionally be subdivided into discrete regions, for example as an arcuate array of discrete filter regions, each region optionally having mutually different optical filtration characteristics.

The filter 800 can be modified so that the circular plate 810 includes a central hole therein arranged to register with a central member about which the plate 810 in operation is actuated in a rotational manner by the elements 840a, 840b, 840c, 840d.

What is claimed is:

1. A tuneable optical filter, comprising:
   a) moveable filtering means for receiving and filtering input radiation to provide corresponding filtered output radiation, the filtering means having spatially varying filtration properties; and b) actuating means for moving the filtering means relative to the input radiation for selecting a portion of the filtering means for use in filtering the input radiation and thereby tuning the filter, the actuating means including at least one actuating element operable in a first phase to flex relatively slowly in a first driving direction to engage with and maintain full frictional contact with the filtering means to thereby impart a lateral force for moving the filtering means relative to the input radiation in the first driving direction, and operable in a second phase to flex relatively more quickly in a second direction mutually opposite to the first driving direction such that frictional contact with the filtering means is lost and the filtering means remains in a displaced position.

2. The filter according to claim 1, in which the filtering means comprises a filtering structure having the spatially varying filtration properties and a moveable support member to which the filtering structure is coupled, and in which said at least one actuating element is operable to repetitively engage with the support member and thereby impart the repetitive lateral force to the support member.

3. The filter according to claim 2, in which the support member has a thermal coefficient of expansion selected for substantially compensating for changes in optical tuning characteristics of the filtering structure as a function of temperature.

4. The filter according to claim 2, in which the filtering structure is configured in a partial or complete annulus with the filtering properties varying in a substantially circumferential direction, and in which said at least one actuating element is operable to rotationally actuate the support member relative to the input radiation.

5. The filter according to claim 2, in which the filtering structure comprises an array of discrete filter regions.

6. The filter according to claim 5, in which the array is a one-dimensional array.

7. The filter according to claim 5, in which the array is a two-dimensional array.

8. The filter according to claim 5, in which the array includes most frequently selected regions clustered together in the structure.

9. The filter according to claim 5, in which each region has spatially varying optical properties for use in fine tuning the filter.

10. The filter according to claim 9, in which the regions comprise at least one of optical gratings and multilayer optical etalons.

11. The filter according to claim 10, in which the regions are operable to at least one of reflect and transmit the input radiation to provide the output radiation.

12. The filter according to claim 2, in which the moveable support member is a planar member mounted between outer members, and a plurality of actuating elements is interposed between the outer members and the moveable planar support member.

13. The filter according to claim 12, comprising resilient biasing means for applying forces to the outer members directed towards the planar member for reducing backlash in slidable motion of the planar member relative to the outer members.

14. The filter according to claim 12, in which the actuating elements are bonded to the outer members and are operable to repetitively engage with the moveable planar support member and thereby impart a repetitive lateral force thereto for moving the filtering structure relative to the outer members.

15. The filter according to claim 12, in which the actuating elements are bonded to the moveable planar support member and are operable to repetitively engage with the outer members and impart a repetitive lateral force thereto for moving the filtering structure relative to the outer members.

16. The filter according to claim 12, in which the moveable support member comprises a polygonal cross-section bar onto which the actuating elements are operable to impart their associated force.

17. The filter according to claim 16, in which the bar is at least one of a substantially triangular cross-section bar and a substantially rectangular cross-section bar.

18. The filter according to claim 1, in which said at least one actuating element employs at least one of piezoelectric, magnetostatic, electrostatic, electromagnetic and thermal expansion effects.

19. The filter according to claim 18, in which said at least one actuating element comprises at least one micro-machined component.

20. The filter according to claim 19, in which said at least one micro-machined component includes a silicon micro-machined component.

21. The filter according to claim 18, in which said at least one actuating element comprises a multilayer piezoelectric structure.

22. The filter according to claim 21, in which each layer is polarized in a direction non-normal to major surfaces of the respective layer.

23. The filter according to claim 21, in which each layer has an anisotropically oriented crystalline structure disposed in a non-normal direction to major surfaces of the layer, and in which the structure is arranged to be excited by an electric field established substantially normally to the major surfaces.

24. The filter according to claim 18, in which said at least one actuating element comprises a guard layer at its exterior surface for protecting an electrode of said at least one of the elements from wear due to repetitive stictional motion.

25. The filter according to claim 2, in which said at least one actuating element comprises ridges formed at an exterior surface for engaging into corresponding ridges on a surface of the support member.

26. The filter according to claim 25, in which the ridges are micro-ridges.

27. The filter according to claim 25, in which the ridges are formed by using one of X-ray and ultra-violet interference patterns transferred by lithographic and etching processes.

28. The filter according to claim 27, in which the ridges are formed at a period spacing in a range of 3 to 30 nm.

29. A filter structure for use in a filter, the filter comprising moveable filtering means for receiving and filtering input radiation to provide corresponding filtered output radiation, the filtering means having spatially varying filtration properties; actuating means for moving the filtering means relative to the input radiation for selecting a portion of the filtering means for use in filtering the input radiation and thereby tuning the filter, the actuating means including at least one actuating element operable in a first phase to flex relatively slowly in a first driving direction to engage with and maintain full frictional contact with the filtering means to thereby impart a lateral force for moving the filtering means relative to the input radiation in the first driving direction, and operable in a second phase to flex relatively more quickly in a second direction mutually opposite to the first driving direction such that frictional contact with the filtering means is lost and the filtering means remains in a displaced position; and the filter structure comprising an array of discrete filter regions for filtering the input radiation.

30. A method of tuning an optical filter having filtering means for filtering input radiation to provide corresponding filtered output radiation, the filtering means having spatially varying filtration properties, and actuating means for moving the filtering means relative to the input radiation for selecting a portion of the filtering means for use in filtering the radiation, the method comprising the steps of:

a) providing in the actuating means one or more actuating elements;

b) driving said one or more elements with one or more electrical drive signals in a first phase to flex relatively slowly in a first driving direction to engage with and maintain full frictional contact with the filtering means to thereby impart a lateral force for moving the filtering means relative to the input radiation in the first driving direction; and c) driving said one or more elements in a second phase to flex relatively more quickly in a second direction mutually opposite to the first driving direction such that frictional contact with the filtering means is lost and the filtering means remains in a displaced position.

* * * * *

UNITED STATES PATENT AND TRADEMARK OFFICE
CERTIFICATE OF CORRECTION

PATENT NO.       : 6,788,479 B2
APPLICATION NO.  : 10/433590
DATED            : September 7, 2004
INVENTOR(S)      : Lomas et al.

It is certified that error appears in the above-identified patent and that said Letters Patent is hereby corrected as shown below:

On the Title Page, in Field (56), under "FOREIGN PATENT DOCUMENTS", in Column 2, Line 1, delete "0 808 900 A1" and insert -- 0 608 900 A1 --, therefor.

On the Title Page, in Field (56), under "FOREIGN PATENT DOCUMENTS", in Column 2, Line 2, delete "0 762 888 A2" and insert -- 0 762 688 A2 --, therefor.

In Column 4, Lines 8-9, after "preferably" delete "operable to flex and thereby generate the repetitive lateral force by employing" and insert -- employ --, therefor.

In Column 4, Line 19, delete "relate" and insert -- relative --, therefor.

Signed and Sealed this

Thirty-first Day of March, 2009

JOHN DOLL
*Acting Director of the United States Patent and Trademark Office*